(12) United States Patent
Hinoki et al.

(10) Patent No.: US 7,303,974 B2
(45) Date of Patent: Dec. 4, 2007

(54) METHOD FOR PRODUCING ELECTROCHEMICAL CAPACITOR ELECTRODE

(75) Inventors: Kiyonori Hinoki, Tokyo (JP); Tsuyoshi Ichiki, Tokyo (JP); Kazutoshi Emoto, Tokyo (JP); Takehiko Sasaki, Tokyo (JP); Kenichi Murakami, Wako (JP); Shigeki Oyama, Wako (JP); Manabu Iwaida, Wako (JP)

(73) Assignee: TDK Corporation and Honda Motor Co., Ltd. (JP)

( * ) Notice: Subject to any disclaimer, the term of this patent is extended or adjusted under 35 U.S.C. 154(b) by 0 days.

(21) Appl. No.: 11/436,043

(22) Filed: May 16, 2006

(65) Prior Publication Data

US 2007/0026140 A1   Feb. 1, 2007

(30) Foreign Application Priority Data

May 17, 2005   (JP)   ............................... 2005-143555

(51) Int. Cl.
- *H01L 21/76* (2006.01)
- *H01L 21/20* (2006.01)
- *H01G 9/00* (2006.01)
- *H01M 6/04* (2006.01)

(52) U.S. Cl. ...................... 438/409; 438/381; 438/400; 29/25.03; 29/623.5; 361/502; 361/503; 429/188; 429/316

(58) Field of Classification Search ................ 438/381, 438/400, 409; 361/502–504, 523, 526; 29/25.03, 29/25.01, 623.5; 429/188, 316

See application file for complete search history.

(56) References Cited

U.S. PATENT DOCUMENTS

| | | | | |
|---|---|---|---|---|
| 6,426,865 | B2 * | 7/2002 | Kasahara et al. | ........... 361/512 |
| 2005/0122664 | A1 * | 6/2005 | Takahashi et al. | .......... 361/530 |
| 2006/0133005 | A1 * | 6/2006 | Miyaki et al. | .............. 361/272 |

FOREIGN PATENT DOCUMENTS

| | | |
|---|---|---|
| JP | 2003-133719 | 9/2003 |
| JP | 2004-047522 | 12/2004 |

* cited by examiner

*Primary Examiner*—Long K. Tran
(74) *Attorney, Agent, or Firm*—Young Law Firm, P.C.

(57) ABSTRACT

A method is provided for optimizing the physical characteristics of a coating solution for an undercoat layer formed between a polarizable electrode layer and surface-roughened collector. A first step is carried out to form an undercoat layer on a collector whose surface has been roughened, and a second step is carried out to form a polarizable electrode layer on the undercoat layer. The first step is performed by coating the collector with a coating solution for the undercoat layer that includes electroconductive particles, a binder, and a solvent; the viscosity of the coating solution for the undercoat layer is set to from 0.15 to 0.75 Pa·s, and the weight ratio (P/B) of the electroconductive particles (P) and binder (B) is set to from 20/80 to 40/60. The coating area of the undercoat layer can thereby be adjusted with high precision, and the resistance of the undercoat layer can be reduced.

12 Claims, 7 Drawing Sheets

METHOD FOR PRODUCING ELECTROCHEMICAL CAPACITOR ELECTRODE

TECHNICAL FIELD

The present invention relates to a method for producing an electrochemical capacitor electrode, and more specifically relates to a method for producing an electrochemical capacitor electrode that is provided with an undercoat layer for bonding a collector and a polarizable electrode layer.

BACKGROUND OF THE INVENTION

In recent years, electric double layer capacitors and other electrochemical capacitors are receiving attention as batteries that are small and lightweight, and in which relatively large capacities can be obtained. An electric double layer capacitor does not use a chemical reaction as does an ordinary secondary battery, and features the capability of very rapid charging and discharging because it is a type of battery that directly stores electric charge on the electrodes.

By making use of such features, there are high expectation for the use of such batteries as a backup power supply for mobile equipment (small electronic equipment) and the like, an auxiliary power supply for electric automobiles and hybrid cars, and as other forms of power supplies, for example, and various forms of research are being carried out in order to improve the performance of such batteries.

An electric double layer capacitor has a basic structure in which electrolytic solution is filled by way of a separator between a pair of collectors in which a polarizable electrode layer is formed. The simplest known method for forming a polarizable electrode layer on a collector is a method of laminating these components together, but this method has a problem in that it is difficult to make the polarizable electrode layer sufficiently thin, and adequate adhesion between the collector and polarizable electrode layer cannot be obtained.

To solve the problems, the collector and polarizable electrode layer are not laminated together, but a coating solution for the polarizable electrode layer is applied to the collector, and the polarizable electrode layer is preferably formed on the collector by drying the fluid. In this case, rather than applying the coating solution for the polarizable electrode layer directly to the collector, the adhesion between the collector and the polarizable electrode layer can be greatly improved by first forming an undercoat layer as an adhesive layer on the collector, and then applying a polarizable electrode layer to the undercoat. See Japanese Patent Application Laid Open Nos. 2003-133179 and 2004-47552.

Metal in the form of a foil (metal foil) is ordinarily used as the material of the collector, and metal foil whose surface has been roughened is sometimes used for the purpose of increasing the adhesion between the collector and the polarizable electrode layer. When a metal foil whose surface has been roughened is used as a collector, the coating solution for the undercoat layer is absorbed by the unevenness of the collector, the coating solution for the undercoat layer is spread by the capillary phenomenon, and other phenomena occur that are different from the case in which the surface of the collector is not roughened when the undercoat layer is formed by coating.

For this reason, it is believed that the coating solution for the undercoat layer requires prescribed physical characteristics to be maintained in order for the undercoat layer to be correctly formed on a collector whose surface has been roughened. When these physical characteristics are not achieved, the formation area of the undercoat layer cannot be correctly controlled, nonuniformity of thickness and internal resistance increases, and other problems occur that cause the characteristics of the electrochemical capacitor to degrade.

SUMMARY OF THE INVENTION

It is therefore an object of the present invention to provide a method for producing an electrochemical capacitor electrode that has good characteristics by optimizing the physical characteristics of the coating solution for the undercoat layer that is formed between the polarizable electrode layer and the collector whose surface has been roughened.

The above and other objects of the present invention can be accomplished by a method for producing an electrochemical capacitor electrode, comprising: a first step for forming an undercoat layer on a collector whose surface has been roughened; and a second step for forming a polarizable electrode layer on said undercoat layer, wherein said first step is performed by coating said collector with a coating solution for the undercoat layer that includes at least electroconductive particles, a binder, and a solvent, a viscosity of said coating solution for the undercoat layer is set to from 0.15 to 0.75 Pa·s and a weight ratio (P/B) of said electroconductive particles (P) and said binder (B) is set to from 20/80 to 40/60.

In accordance with the present invention, the coating area of the undercoat layer can be adjusted with high precision and the resistance of the undercoat layer can be reduced because of the optimized characteristics of the coating solution for the undercoat layer formed on the collector whose surface has been roughened. Also, the adhesion between the collector and the polarizable electrode layer can be enhanced, and the surface properties of the undercoat layer and the polarizable electrode layer formed on the undercoat layer can be improved.

In the present invention, the electroconductive particles preferably includes acetylene black. The binder is preferably a fluorine-based binder. The solvent includes a good solvent that dissolves the binder and a poor solvent that does not dissolve the binder. The solvent preferably includes methyl isobutyl ketone.

In the present invention, the second step is preferably performed by coating said undercoat layer with a coating solution for the polarizable electrode layer that includes porous particles, a fluorine-based binder, a good solvent that dissolved said fluorine-based binder, and a poor solvent that does not dissolve said fluorine-based binder. In this case, the viscosity of said coating solution for the polarizable electrode layer is preferably set to from 0.5 to 3.5 Pa·s and the weight ratio (GS/PS) of said good solvent (GS) and said poor solvent (PS) is preferably set to from 60/40 to 80/20.

In accordance therewith, cracks are unlikely to form in the polarizable electrode layer, the thickness of the polarizable electrode layer can be reduced, and the surface of the polarizable electrode layer can be made more even.

Thus, in accordance with the present invention, an electrochemical capacitor electrode that displays good characteristics when in service can be obtained because the conditions for coating the collector whose surface is roughened are optimized in terms of the physical characteristics of the coating solution for the undercoat layer.

More specifically, defects can be prevented such as when all or a portion of the electrode brought out from the collector is covered by the undercoat layer, or when areas without an undercoat layer between the collector and polarizable electrode layer are present. This can be achieved because the coating area of the undercoat layer can be adjusted with high precision.

Also, since thickness is only slightly nonuniform, dimensional variability is unlikely to occur even when a large number of layers of electrochemical capacitor electrodes are superimposed. For this reason, a high-capacity electrochemical capacitor can be manufactured. The internal resistance can furthermore be suppressed and a high performance electrochemical capacitor can therefore be manufactured.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
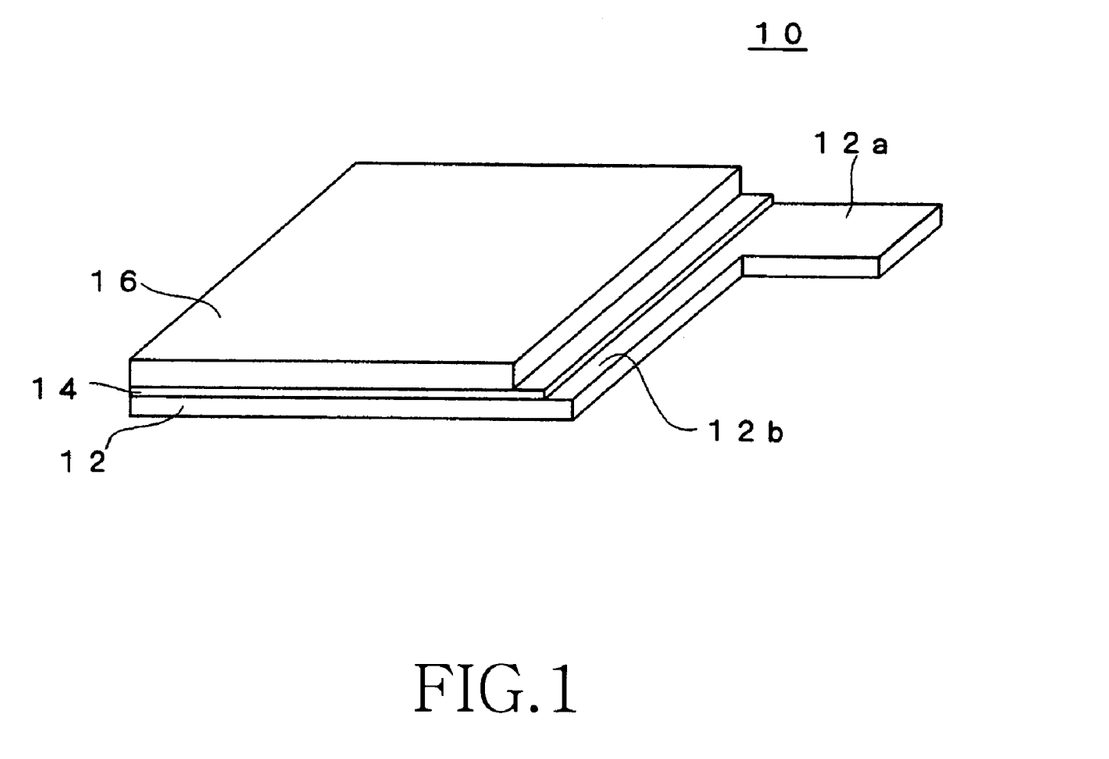
FIG. 1 is a schematic perspective view that shows a structure of an electric double layer capacitor electrode produced by the method of the preferred embodiments of the present invention.

FIG. 1 is a schematic perspective view that shows the structure of an electric double layer capacitor electrode produced by the method of the preferred embodiments of the present invention.

The electric double layer capacitor electrode 10 produced by the method of the present embodiment is provided with a collector 12 having electron conductivity, an undercoat layer 14 having electron conductivity formed on the collector 12, and a polarizable electrode layer 16 having electron conductivity formed on the undercoat layer 14, as shown in FIG. 1. The collector 12 is provided with an extraction electrode 12a, which is a lead.

The material of the collector 12 is not particularly limited as long as the material is a good conductor that can adequately transmit an electric charge to the polarizable electrode layer 16, and a known collector material that is used in electrodes for electric double layer capacitors may be used, an example of which is aluminum (Al). In the present invention, the surface 12b (surface of the undercoat layer 14 side) of the collector 12 has been roughened, and the bond between the undercoat layer 14 and polarizable electrode layer 16 has thereby been improved.

The method for roughening the surface of the collector 12 is not particularly limited, but may be one in which the surface is roughened by chemical etching with acid or another chemical. The etching depth is preferably set to about 3 to 7 µm. This is due to the fact that the effect of improving adhesion is substantially lost if the etching is too shallow, and, conversely, it is difficult to uniformly coat the undercoat layer 14 if the etching is excessively deep. There is no particular requirement that the reverse surface of the collector 12 be roughened, but when the undercoat layer 14 and polarizable electrode layer 16 are formed on both surfaces of the collector 12, as described later, both surfaces of the collector 12 must be roughened.

The thickness of the collector 12 is also not particular limited, but in order to reduce the size of the electric double layer capacitor that is to be produced, the thickness is preferably set to be as minimal as possible in a range that assures sufficient mechanical strength. More specifically, when aluminum (Al) is used as the material of collector 12, the thickness is preferably set to be 10 µm or greater and 100 µm or less, and even more preferably 15 µm or greater and 50 µm or less. If the thickness of the collector 12 composed of aluminum (Al) is set to be in this range, the electric double layer capacitor that is ultimately manufactured can be made smaller while assuring sufficient mechanical strength.

The undercoat layer 14 is disposed between the collector 12 and the polarizable electrode layer 16, and serves to improve the physical and electrical bond between these components. A material with high electroconductive properties must be used for the undercoat layer 14 in order to prevent an increase in internal resistance, and the undercoat layer 14 formed by the method of the present invention includes electroconductive particles and a binder that can bind the electroconductive particles together. The specific materials of the electroconductive particles and binder that constitute the undercoat layer 14 are described later.

The overall thickness of the undercoat layer 14 is preferably made as minimal as possible, and from the aspect of preventing an increase in the internal resistance of the electric double layer capacitor electrode 10, the thickness is preferably as minimal as possible in a range that allows the collector 12 and polarizable electrode layer 16 to be sufficiently bondable. Specifically, the preferred thickness is 0.2 µm or greater and 10 µm or less.

The polarizable electrode layer 16 is a layer that is formed on the undercoat layer 14 and that contributes to the storage and discharge of electric charge. The polarizable electrode layer 16 includes, as constituent materials, at least porous particles having electron conductivity and a binder that can bind the porous particles to each other, and preferably has an electroconductive aid having electron conductivity. The specific materials of the porous particles, binder, and other components constituting the polarizable electrode layer 16 are described later.

From the viewpoint of ensuring a smaller and more lightweight electric double layer capacitor electrode 10, the thickness of the polarizable electrode layer 16 is preferably 50 to 200 µm, and is more preferably 80 to 150 µm. A smaller and more lightweight electric double layer capacitor that is ultimately manufactured can be obtained by setting the thickness of the polarizable electrode layer 16 in the above-described range.

The overall thickness (maximum film thickness) of the electric double layer capacitor electrode 10 having such a structure is preferably 65 to 250 μm, and is more preferably 100 to 180 μm. A smaller and more lightweight electric double layer capacitor that is ultimately manufactured can be achieved by setting the thickness to such a range.

Described above is the structure of an electric double layer capacitor electrode 10 that is manufactured by the production method of the preferred embodiments of the present invention.

Figure 2:
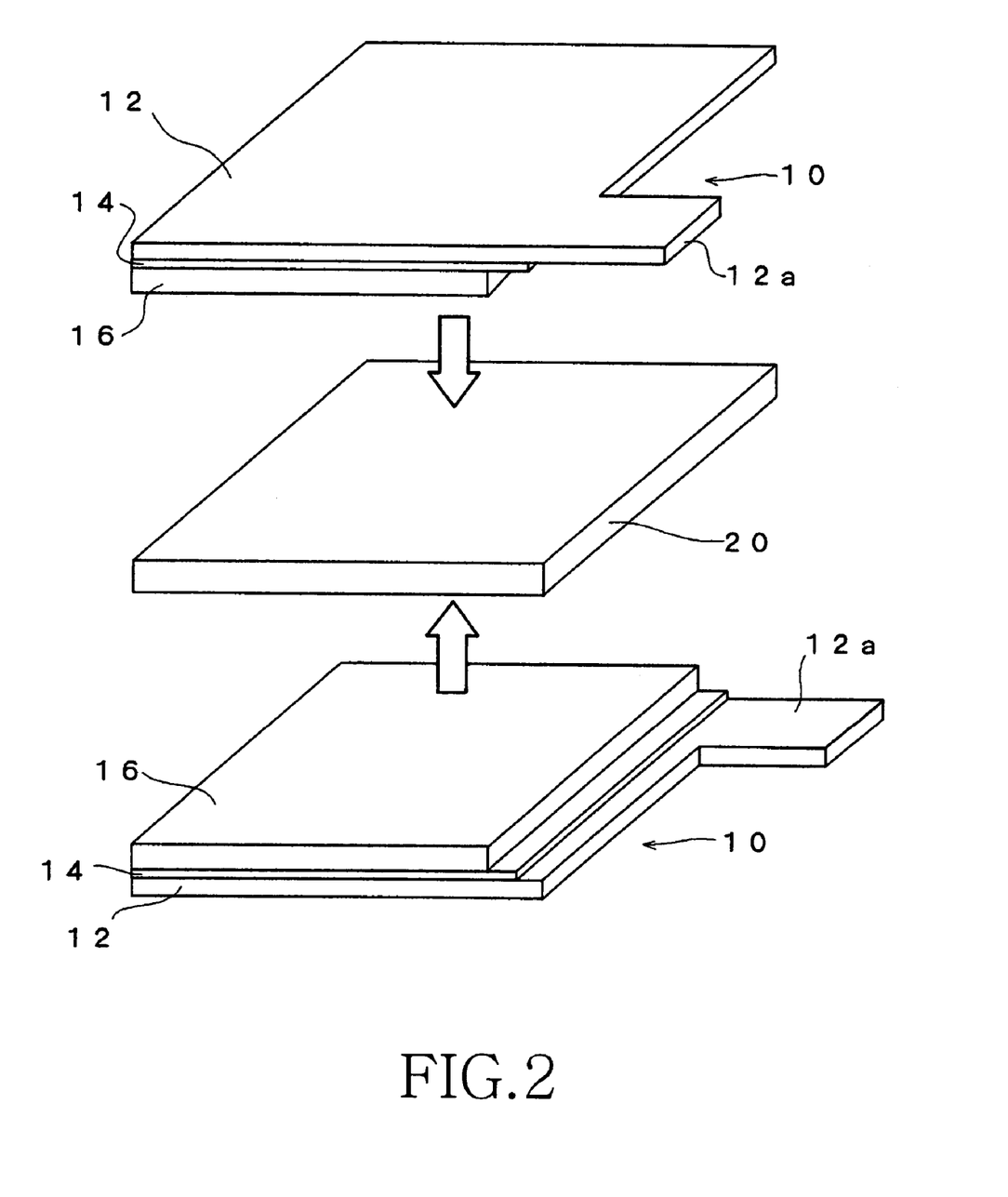
FIG. 2 is a schematic perspective view illustrating the method of manufacturing an electric double layer capacitor using two electric double layer capacitor electrodes shown in FIG. 1.

When an actual electric double layer capacitor is manufactured using such an electric double layer capacitor electrode 10, a separator 20 is inserted between a pair of electric double layer capacitor electrodes 10, as shown in FIG. 2, the structure is placed in a case (not shown), and the product is completed by filling the case with electrolytic solution. An electric double layer capacitor terminated with the extraction electrodes 12a, which are parts of the collectors 12, is thereby obtained.

The separator 20 is a film for physically separating the polarizable electrode layers 16, and 16, while allowing the electrolytic solution to move between the polarizable electrode layers 16 and 16. The separator 20 is preferably formed from a nonconductive porous body, and examples of materials that may be used include a laminated film consisting of polyethylene, polypropylene, or polyolefin; a drawn film composed of a mixture of the above-mentioned resins; or a fiber nonwoven composed of at least one constituent material selected from the group consisting of cellulose, polyester, and polypropylene. The thickness of the separator 20 is not particularly limited, but is preferably 15 μm or greater and 200 μm or less, and is more preferably 30 μm or greater and 100 μm or less.

An electrolytic solution that is used in known electric double layer capacitors can be used in this case. For example, electrolytic aqueous solution or electrolytic solution using an organic solvent can be used.

However, since the withstand voltage of the capacitor is limited because of the electrochemically low decomposition voltage, the electrolytic solution used in electric double layer capacitors is preferably an electrolytic solution in which an organic solvent (non-aqueous electrolyte solution) is used. The specific type of electrolytic solution is not limited, but the electrolytic solution is preferably selected with consideration given to the solubility of the solute, the degree of dissociation, and the viscosity of the fluid.

Particularly preferred is an electrolytic solution that is highly conductive and that has a high electric potential window (a high decomposition start voltage). Typical examples include solutions in which a quaternary ammonium salt such as tetraethylammonium tetrafluoroborate is dissolved in propylene carbonate, diethylene carbonate, acetonitrile, or another organic solvent. In this case, contamination with moisture must be strictly controlled.

Described in detail next is the production method of the preferred embodiments of the present invention.

Figure 3:
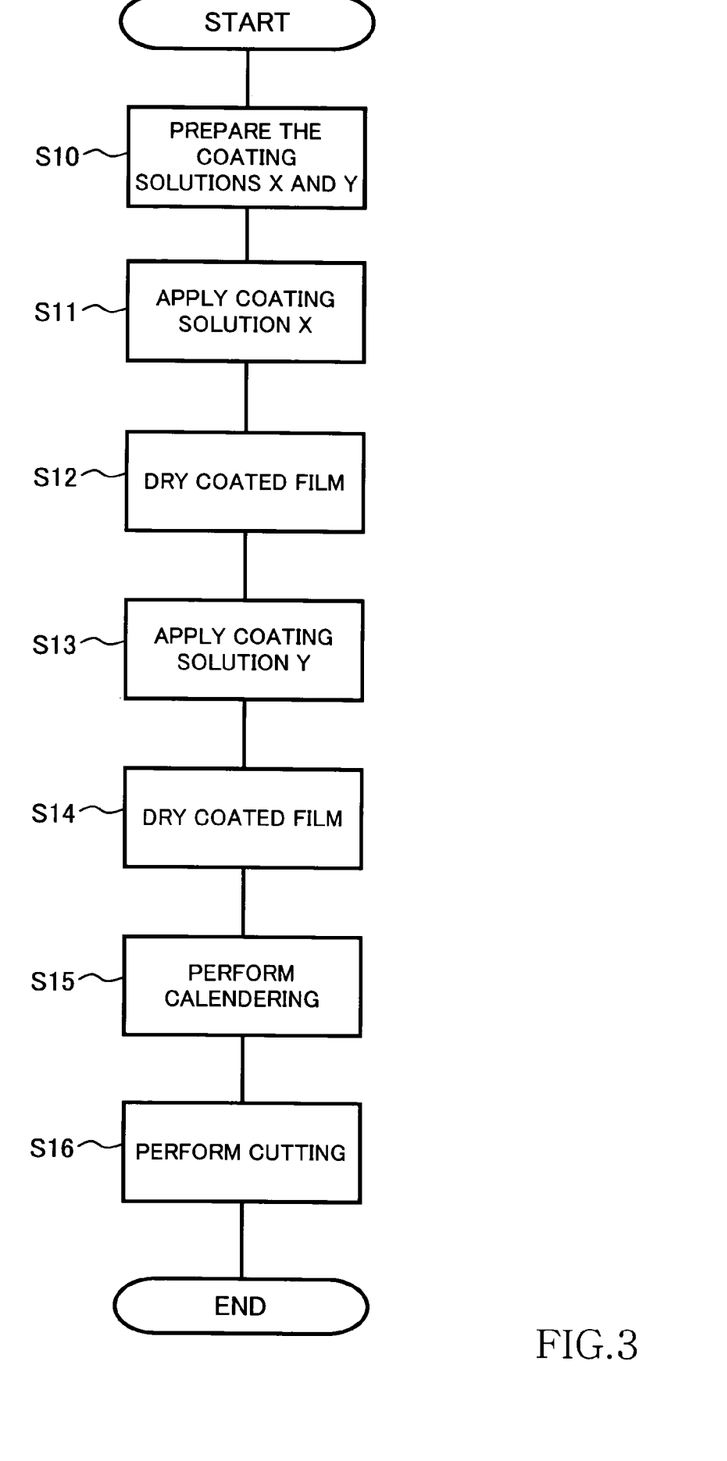
FIG. 3 is a flowchart describing the manufacturing method of the electric double layer capacitor electrode of the preferred embodiments of the present invention.

FIG. 3 is a flowchart describing the production method of the electric double layer capacitor electrode 10 of the preferred embodiments of the present invention. Described below is the production method of the electric double layer capacitor electrode 10 of the present embodiment with reference to the flowchart.

Prepared first are the coating solution that is the material of the undercoat layer 14, i.e., the coating solution X for the undercoat layer, and the coating solution that is the material of the polarizable electrode layer 16, i.e., the coating solution Y for the polarizable electrode layer (step S10).

Figure 4:
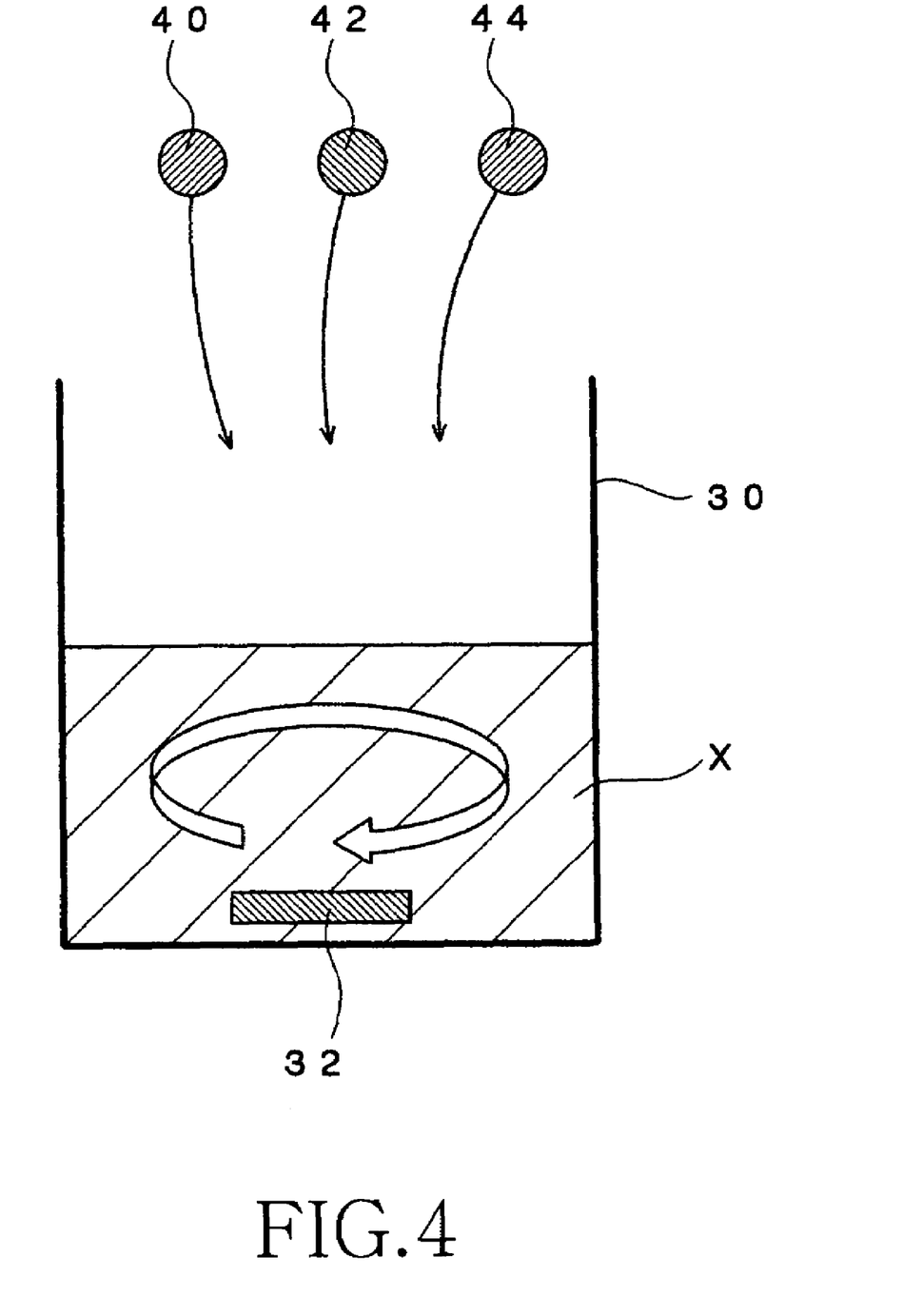
FIG. 4 is a schematic diagram illustrating the method of preparing the coating solution for an undercoat layer.

The coating solution X for the undercoat layer is prepared in the following manner. First, electroconductive particles 40, a binder 42, and a solvent 44 are loaded into a mixing apparatus 30 provided with a stirring unit 32, as shown in FIG. 4. The coating solution X for the undercoat layer can then be prepared by stirring the components using the stirring unit 32.

The preparation of the coating solution X for the undercoat layer preferably includes a kneading operation and/or a dilution mixing operation. As referred to herein, the term "kneading" refers to the kneading together of materials by stirring with the liquid in a relatively high viscous state, and the term "dilution mixing" refers to adding solutions and the like to the kneaded liquid and mixing the mixture in a relatively low viscous state. The time and temperature of these operations are not particularly limited, but from the viewpoint of obtaining a uniformly dispersed state, the kneading time is preferably about 30 minutes to 2 hours, the temperature during kneading is preferably about 40 to 80° C., the dilution mixing time is preferably about 1 to 5 hours, and the temperature during dilution mixing is preferably about 20 to 50° C.

The electroconductive particles 40 included in the coating solution X for the undercoat layer are not particularly limited as long as the particles have electron conductivity that is sufficient to allow the movement of electric charge between the collector 12 and polarizable electrode layer 16. Such particles may be composed of carbon material or the like having electron conductive properties, and the use of carbon black and graphite is more specifically preferred.

Examples of carbon black that may be used include acetylene black, Ketjen black, and furnace black, but preferably among these is acetylene black. The average particle size of the carbon black is preferably 25 to 50 nm. The BET specific surface area that is determined from the nitrogen adsorption isotherm by using the BET adsorption isotherm is preferably 50 $m^2/g$ or greater, and is more preferably 50 to 140 $m^2/g$.

Also, examples of graphite include natural graphite, artificial graphite, and expanded graphite, and the use of artificial graphite is especially preferred. The average particle diameter of graphite is preferably 4 to 6 μm. The BET specific surface area is preferably 10 $m^2/g$ or greater, and is more preferably 15 to 30 $m^2/g$. By using such graphite, it becomes possible to impart excellent electron conductivity to the undercoat layer 14, and the internal resistance tends to be satisfactorily reduced.

On the other hand, the binder 42 included in the coating solution X for the undercoat layer is not particularly limited as long as it is a material that can bind the electroconductive particles 40, examples of which include polytetrafluoroethylene (PTFE), polyvinylidene fluoride (PVDF), polyethylene (PE), polypropylene (PP), and fluorine rubber.

Preferred among these is the use of polytetrafluoroethylene (PTFE), polyvinylidene fluoride (PVDF), fluorine rubber, or another fluorine-based binder, and particularly preferred is the use of fluorine rubber. This is due to the fact that the use of fluorine rubber allows the electroconductive particles to sufficiently bind, even if a small amount is used, and the physical and electrical bonding characteristics between the collector 12 and polarizable electrode layer 16 are improved. This is also due to the fact that fluorine rubber is electrochemically stable.

Examples of fluorine rubber include vinylidene fluoride-hexafluoropropylene-tetrafluoropropylene (VDF-HFP-TFE) copolymers, vinylidene fluoride-hexafluoropropylene (VDF-HFP) copolymers, vinylidene fluoride-pentafluoropropylene (VDF-PFP) copolymers, vinylidene fluoride-pentafluoropropylene-tetrafluoroethylene (VDF-PFP-TFE) copolymers, vinylidene fluoride-perfluoromethyl vinyl ether-tetrafluoroethylene (VDF-PFMVE-TFE) copolymers, vinylidene fluoride-chlorotrifluoroethylene (VDF-CTFE) copolymers, ethylene-tetrafluoroethylene copolymers, and propylene-tetrafluoroethylene copolymers.

Particularly preferred among these is a fluorine rubber in which at least two types selected from the group consisting of VDF, HFP, and TFE are copolymerized. Particularly preferred are VDF-HFP-TFE copolymers in which the three types in the above-mentioned group are copolymerized, because the adhesion and chemical resistance tend to be further improved.

The solvent 44 included in the coating solution X for the undercoat layer is not particularly limited as long as it can dissolve or disperse the binder 42. Examples of the solvent include methylethyl ketone (MEK), methylisobutyl ketone (MIBK), and other ketone-based solvents. A poor solvent that does not dissolve fluorine rubber may be mixed with the solvent 44.

The ratio of the poor solvent is preferably less than 50 wt % of the entire weight. Examples of poor solvents that do not dissolve the fluorine rubber include esters, saturated hydrocarbons, aromatic hydrocarbons, and alcohol, but preferred among these are propylene carbonate and ethylene carbonate. When the dilution mixing operation is carried out after the kneading operation, methylisobutyl ketone (MIBK) or the like is preferably used as the solvent 44 during the kneading operation, and propylene carbonate or another poor solvent is preferably used in addition to the good solvent during the dilution mixing operation.

The ratios of the electroconductive particles 40, binder 42, and solvent 44 included in such a coating solution X for the undercoat layer are not particularly limited, but in the present invention, the viscosity of the coating solution X for the undercoat layer must be 0.15 to 0.75 Pa·s, and the weight ratio (P/B) of the electroconductive particles (P) 40 and binder (B) 42 must be 20/80 to 40/60.

These are the required conditions for correctly forming the undercoat layer 14 on the roughened surface of the collector 12, and by using a coating solution X for the undercoat layer that satisfies the above-described conditions, the coating area of the undercoat layer 14 can be adjusted with high precision and the resistance of the undercoat layer 14 can be reduced. Also, the bond between collector 12 and polarizable electrode layer 16 can be improved by satisfying the above-described conditions, and the surface characteristics of the undercoat layer 14 and the polarizable electrode layer 16 that is formed thereon can be improved.

This is due to the fact that when the viscosity of the coating solution X for the undercoat layer is less than 0.15 Pa·s, the coating accuracy of the undercoat layer 14 degrades due to insufficient viscosity, and a coated film cannot be correctly formed in the desired area. Also, when the viscosity of the coating solution X for the undercoat layer is greater than 0.75 Pa·s, not only is the resistance of the undercoat layer 14 is increased due to the excessive viscosity, but peeling also occurs more readily due to reduced adhesion.

When the P/B ratio of the coating solution X for the undercoat layer is less than 20/80, the resistance of the undercoat layer 14 increases, and conversely, when the P/B ratio of the coating solution X for the undercoat layer is greater than 40/60, the surface characteristics of the undercoat layer 14 and the polarizable electrode layer 16 formed on the undercoat layer are degraded, large nonuniformities are generated in the film thickness, the internal resistance increases, and the adhesion is also ultimately reduced.

Considerable dimensional variability appears in the thickness of the film when a large number of electric double layer capacitor electrodes 10 are superimposed. Therefore, when the nonuniformity in the film thickness is considerable, the number of layers of electric double layer capacitor electrodes 10 that can be laminated is ultimately limited. In actuality, in order to laminate several hundred electric double layer capacitor electrodes 10 by way of separators 20, the thickness differences (the difference between portions in which the film is thick and portions in which the film is thin) are preferably kept to 7% or less with respect to the coated film thickness.

In contrast, when the coating solution X for the undercoat layer satisfies the above-described conditions, the occurrence of such deficiencies can be suppressed, and an excellent undercoat layer 14 can be formed. In particular, the viscosity of the coating solution X for the undercoat layer is preferably 0.3 to 0.4 Pa·s, and the P/B ratio is preferably about 30/70. An even more excellent undercoat layer 14 can thereby be formed.

Therefore, the ratio and materials of electroconductive particles 40, binder 42, and solvent 44 included in the coating solution X for the undercoat layer must satisfy the above-described conditions.

Figure 5:
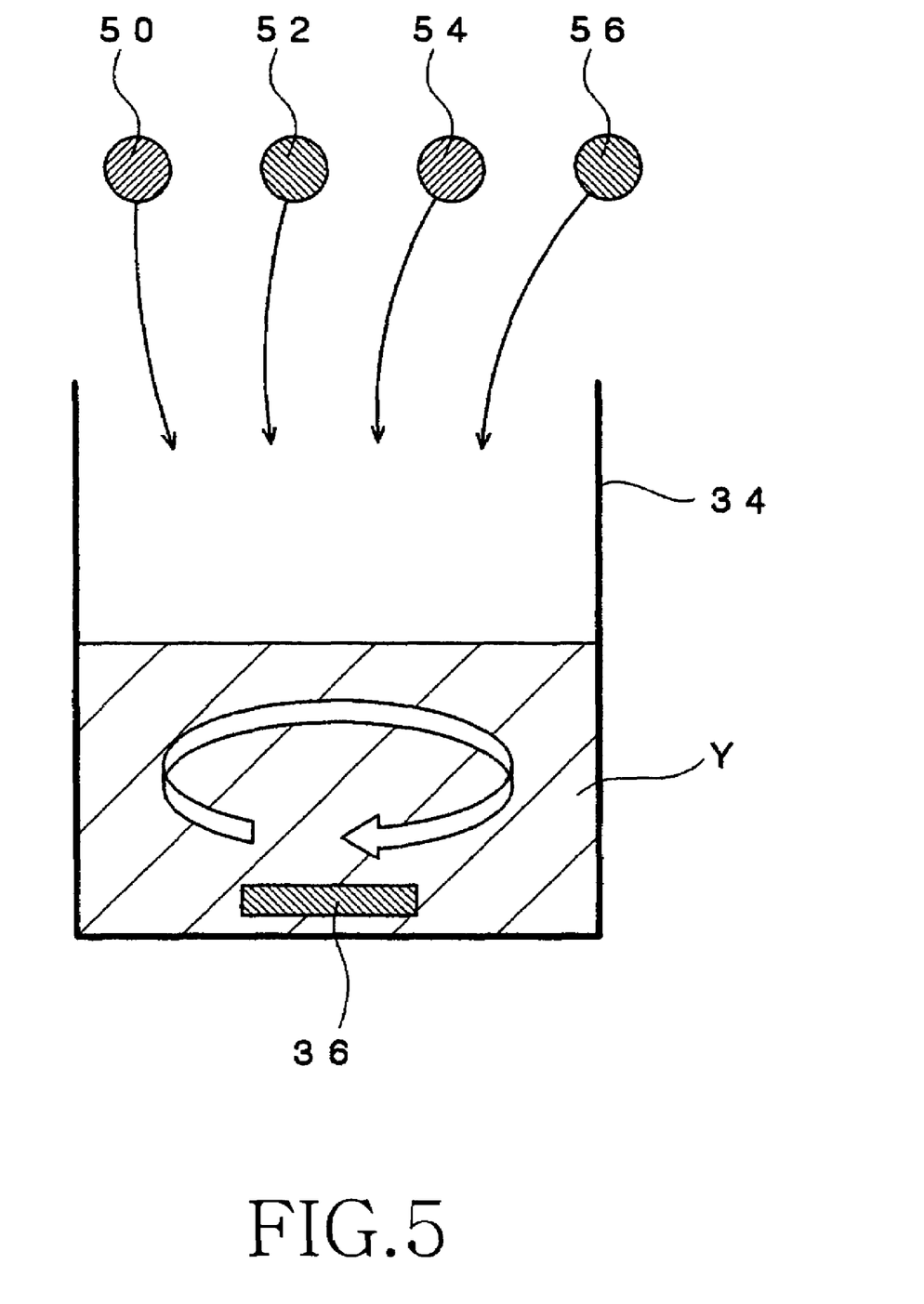
FIG. 5 is a schematic diagram illustrating the method of preparing the coating solution for a polarizable electrode layer.

On the other hand, the coating solution Y for the polarizable electrode layer is prepared by placing porous particles 50, a binder 52, and a solvent 54 in a mixing apparatus 34 provided with a stirring unit 36 and stirring the components, as shown in FIG. 5. The preparation of the coating solution Y for the polarizable electrode layer preferably includes a kneading operation and/or a dilution mixing operation.

The porous particles 50 included in the coating solution Y for the polarizable electrode layer are not particularly limited as long as the porous particles have electron conductivity that contributes to the storage and discharge of electric charge. An example of such particles is reactivated carbon or the like in the form of particles or fibers. Phenol-based activated carbon, coconut shell activated carbon, or the like may be used. The average diameter of the porous particles is preferably 3 to 20 µm, and the BET specific surface area is preferably 1,500 $m^2/g$ or greater and is more preferably 2,000 to 2,500 $m^2/g$. Using such porous particles 50 makes it possible to obtain a high volume capacity.

The binder 52 included in the coating solution Y for the polarizable electrode layer is not particularly limited as long as it is a binder that can bind the porous particles 50. Material of the binder 52 can be the same as the material of the binder 42 in the coating solution X for the undercoat layer. That is, examples of materials that may be used as the binder 52 in the coating solution Y for the polarizable electrode layer include polytetrafluoroethylene (PTFE), polyvinylidene fluoride (PVDF), polyethylene (PE), polypropylene (PP), and fluorine rubber. Preferred among these in this case is the use of polytetrafluoroethylene (PTFE), polyvinylidene fluoride (PVDF), fluorine rubber, or another fluorine-based binder, and particularly preferred is the use of fluorine rubber.

This is due to the fact that the use of fluorine rubber allows the porous particles to sufficiently bind, even if a small amount is used. The strength of the coated film of the polarizable electrode layer 16 can thereby be enhanced, the size of the double layer interface can be improved, and the volume capacity can be increased. Preferred specific examples of fluorine rubber are the same as the preferred materials given as the binder 42 of the coating solution X for the undercoat layer.

The solvent 54 included in the coating solution Y for the polarizable electrode layer is not particularly limited as long as it can dissolve or disperse the binder 52, but preferably used is a mixed solvent composed of methylethyl ketone (MEK) methylisobutyl ketone (MIBK), or another ketone-based solvent, or another good solvent, and propylene carbonate, ethylene carbonate, or another poor solvent.

An electroconductive aid 56 is preferably added as required to the coating solution Y for the polarizable electrode layer. The electroconductive aid 56 is not particularly limited as long as it has electron conductivity that allows adequate movement of electric charge between the collector 12 and polarizable electrode layer 16. An example of such an aid is carbon black. Examples of carbon black that may be used include materials that can be advantageously used as the electroconductive particles 40 of the coating solution X for the undercoat layer; specifically, acetylene black, Ketjen black, and furnace black.

The ratios of the porous particles 50, binder 52, and solvent 54 that are included in the coating solution Y for the polarizable electrode layer, and the optionally added electroconductive aid 56 are not particularly limited, but in the case that a fluorine-based binder is used as the binder 52, the viscosity of the coating solution Y for the polarizable electrode layer is preferably 0.5 to 3.5 Pa·s. The preferred weight ratio (GS/PS) of the good solvent (GS) and poor solvent (PS) is 60/40 to 80/20.

These are the preferred conditions for effectively preventing cracks from occurring in the polarizable electrode layer 16, and for smoothing the surface of the polarizable electrode layer 16. In other words, if the GS/PS ratio of the coating solution Y for the polarizable electrode layer is less than 60/40, the possibility that cracks will occur in the polarizable electrode layer 16 due to insufficient binder 52 dissolution will increase, and if the GS/PS ratio of the coating solution Y for the polarizable electrode layer is greater than 80/20, or if the viscosity of the coating solution Y for the polarizable electrode layer is less than 0.5 Pa·s or in excess of 3.5 Pa·s, the surface characteristics of the polarizable electrode layer 16 will be reduced due to the degraded coating conditions, and considerable nonuniformities are liable to occur in the film thickness.

In contrast, when the coating solution Y for the polarizable electrode layer satisfies the above-described conditions, the occurrence of such deficiencies can be suppressed, and an excellent polarizable electrode layer 16 can be formed. In particular, the viscosity of the coating solution Y for the polarizable electrode layer is preferably 1.0 to 1.5 Pa·s, and the GS/PS ratio is preferably about 70/30. An even better polarizable electrode layer 16 can thereby be formed.

Therefore, the materials and ratios of the porous particles 50, binder 52, and solvent 54 that are included in the coating solution Y for the polarizable electrode layer, and the optionally added electroconductive aid 56 are preferably selected so as to satisfy the above-described conditions.

After the coating solution X for the undercoat layer and coating solution Y for the polarizable electrode layer are thus prepared (step S10), a coated film is subsequently formed by coating the coating solution X for the undercoat layer on the roughened surface 12b of the collector 12 (step S11) and the solvent 44 included in the coated film is removed by drying (step S12). The coating solution Y for the polarizable electrode layer is then coated onto the above-described coated film (step S13), after which the solvent 54 included in the coated films is removed by drying (step S14).

Known application methods may be used without particular limitation to apply the coating solution X for the undercoat layer and the coating solution Y for the polarizable electrode layer. Examples of methods that may be adopted include extrusion nozzle, extrusion lamination, doctor blades gravure rolling, reverse rolling, applicator coating, kiss coating, bar coating, and screen printing. Among these methods, the extrusion nozzle method is preferred because of particular consideration related to the viscosity of the coating solution, changes in the coating solution (there is a tendency for the viscosity to increase due to the volatilization of the solution in an open method), and the thickness stability of the polarizable electrode layer 16.

The coated film may be dried by heating for a prescribed length of time. The drying may be specifically carried out at 70 to 130° C. for 0.1 to 10 minutes. An electrode sheet in which the undercoat layer 14 and polarizable electrode layer 16 are laminated onto the collector 12 can be obtained by the above-described process.

Next, the electrode sheet is calendered using a roll press, and the polarizable electrode layer 16 is thereby compressed (step S15). This step is designed to increase the volume capacity by compressing the polarizable electrode layer 16, and the calendering process is preferably repeated a plurality of times in order to increase the volume capacity.

Figure 6:
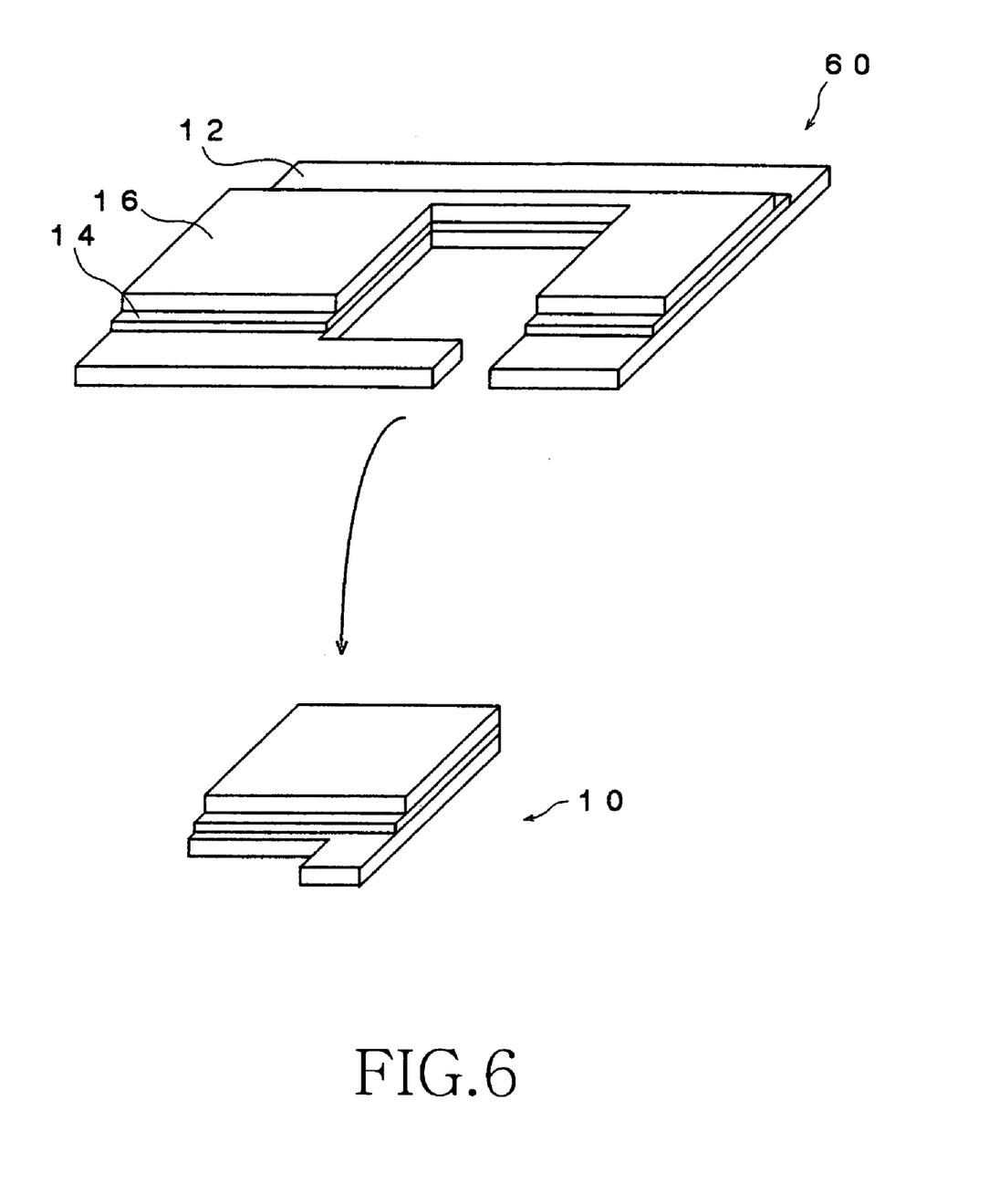
FIG. 6 is a schematic diagram illustrating the method for cutting out an electric double layer capacitor electrode shown in FIG. 1 from an electrode sheet.

The calendered electrode sheet 60 is then cut to the required size and shape (step S16), as shown in FIG. 6, to complete the electric double layer capacitor electrode 10 shown in FIG. 1. A separator 20 is thereafter inserted between a pair of such electric double layer capacitor electrodes 10, as described in FIG. 2, and the unit is placed in a case (not shown). The case is then filled with an electrolytic solution to complete an electric double layer capacitor.

Thus, in the present embodiment, the viscosity of the coating solution X for the undercoat layer is 0.15 to 0.75 Pas, and is more preferably 0.3 to 0.4 Pa·s; and the weight ratio (P/B) of the electroconductive particles (P) 40 and the binder (B) 42 is 20/80 to 40/60, and is preferably about 30/70. Therefore, the coating area of the undercoat layer 14 can be adjusted with high precision, and the resistance of the undercoat layer 14 can be reduced. Also, the bonding characteristics between the collector 12 and polarizable electrode layer 16 can be enhanced, and the surface characteristics of the undercoat layer 14 and the polarizable electrode layer 16 formed on the undercoat layer can be improved.

Furthermore, if the viscosity of the coating solution Y for the polarizable electrode layer is 0.5 to 3.5 Pa·s, or preferably 1.0 to 1.5 Pa·s, and the weight ratio (GS/PS) of the good solvent (GS) and poor solvent (PS) is 60/40 to 80/20, or preferably about 70/30, cracks are less likely to occur in the polarizable electrode layer 16, and the surface of the polarizable electrode layer 16 can be made smooth.

Figure 7:
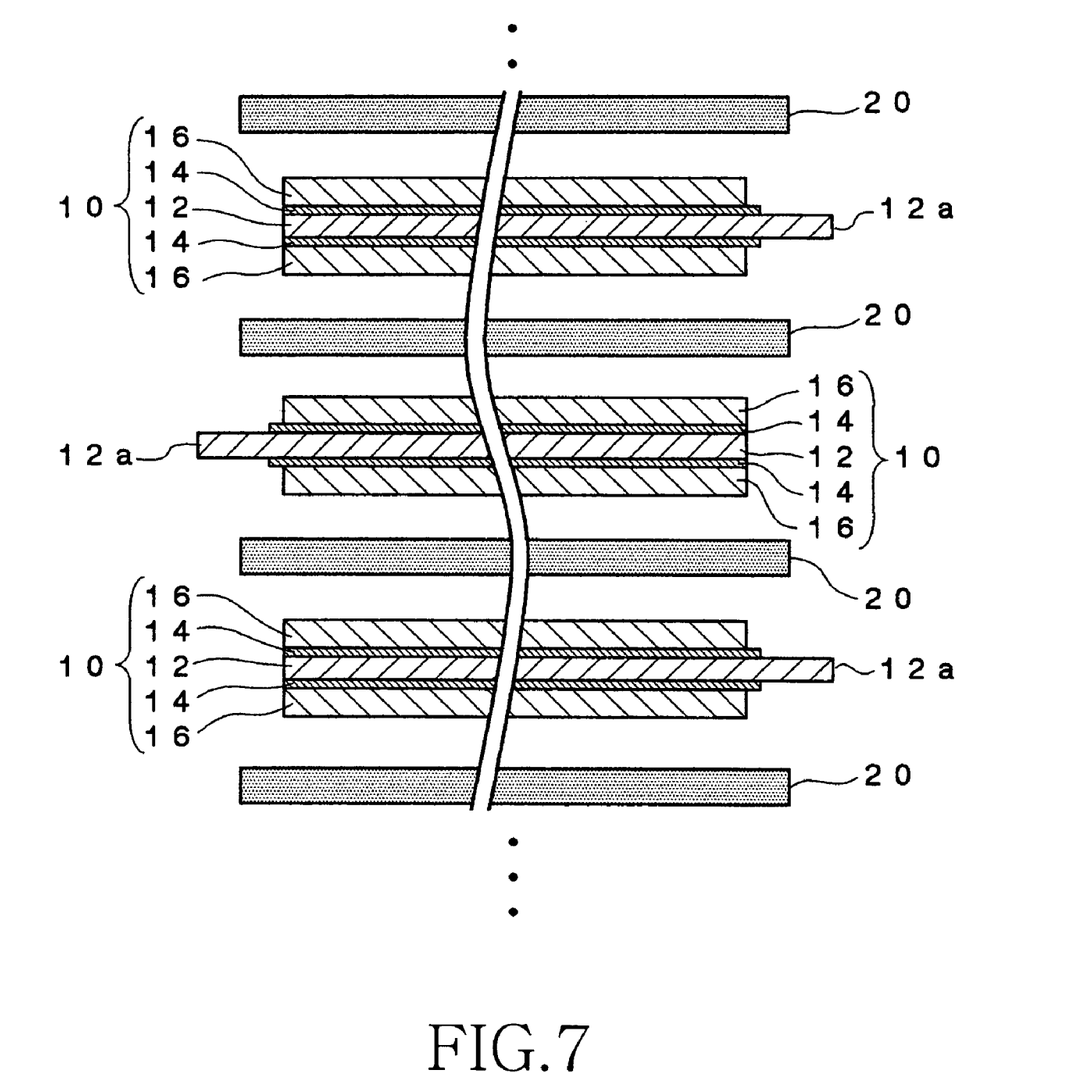
FIG. 7 is a schematic diagram illustrating the method of manufacturing a high-capacity electric double layer capacitor using an electric double layer capacitor electrode shown in FIG. 1 in which an undercoat layer and a polarizable electrode layer are formed on both sides of a collector.

In the above-described embodiments, the undercoat layer 14 and polarizable electrode layer 16 were formed only on one side of the collector 12, but if these components are formed on both sides of the collector 12, separators 20 can be inserted between each of a large number of layers of electric double layer capacitor electrodes 10, and the extraction electrodes 12a of the collectors 12 can be alternately brought out to manufacture an electric double layer capacitor with a larger capacity, as shown in FIG. 7.

The present invention is in no way limited to the aforementioned embodiments, but rather various modifications are possible within the scope of the invention as recited in the claims, and naturally these modifications are included within the scope of the invention.

For example, the electrochemical capacitor electrode produced by the present invention can be used as an electrode for an electric double layer capacitor, as well as an electrode for a pseudo-capacity capacitor, a pseudo capacitor, a redox capacitor, and various other electrochemical capacitors.

EXAMPLES

Examples of the present invention are described below, but the present invention is not limited in any manner by the examples.

Working Example 1

The electroconductive particles used in the coating solution X for the undercoat layer were prepared by mixing 33 parts by weight of acetylene black (product name: Denka Black manufactured by Denki Kagaku Kogyo) and 33 parts by weight of graphite for 15 minutes by using a planetary disperser. Further added to the entire weight of the mixture were 35 parts by weight of fluorine rubber (product name: Viton-GF manufactured by DuPont Dow Elastomer) as a binder and 140 parts by weight of methylisobutyl ketone (MIBK) as a solvent (good solvent), and the mixture was kneaded for 45 minutes using a planetary disperser.

Subsequently added were 119 parts by weight of the above-mentioned fluorine rubber as a binder, 1,543 parts by weight of MIBK (good solvent) as a solvent, and 297 parts by weight of propylene carbonate (poor solvent). The mixture was stirred for four hours and a coating solution X for the undercoat layer was prepared. The weight ratio (P/B) of the electroconductive particles (P) and the binder (B) was 30/70.

The viscosity of the resulting coating solution X for the undercoat layer was subsequently measured using the following method. First, the shear rate was measured using a viscometer (product name: MR-300 manufactured by Rheology) as the measuring apparatus. Next, the viscosity (V10) was calculated at a shear rate of 10 $S^{-1}$ from the measured shear rate by using the Ostwald flow equation.

[Shear stress]=$k$·[Shear rate]$^n$

Used as the measurement jig was a cone plate with a cone radius of 39.97 mm and a cone angle of 1.92 deg. A wire with a diameter of 1.6 mm was used and measurement was continuously carried out at a maximum shear rate of 300 $S^{-1}$. The measurement was performed at 25° C. and was started two minutes after the coating solution (25° C.) was gathered.

As a result of such measurements, the viscosity of the resulting coating solution X for the undercoat layer was 0.37 Pa·s.

The porous particles used in the coating solution Y for the polarizable electrode layer were prepared by mixing 87 parts by weight of granular activated carbon (product name: RP-20, manufactured by Kuraray Chemical) and 3 parts by weight of acetylene black (product name: Denka Black manufactured by Denki Kagaku Kogyo) as an electroconductive aid for 15 minutes by using a planetary disperser. Further added to the entire weight of the mixture were 10 parts by weight of fluorine rubber (product name: Viton-GF manufactured by DuPont Dow Elastomer) as a binder, 51.1 parts by weight of MIBK (good solvent) as a solvent, and 81 parts by weight of propylene carbonate (poor solvent), and the mixture was kneaded for 45 minutes by a planetary disperser.

Furthermore, 137.9 parts by weight of MIBK (good solvent) as a solvent were added to the mixture, and the mixture was stirred for four hours to prepare the coating solution Y for the polarizable electrode layer. The weight ratio (GS/PS) of the good solvent (GS) and poor solvent (PS) was 70/30.

The viscosity of the resulting coating solution Y for the polarizable electrode layer was measured using the above-described method and found to be 1.2 Pa·s.

Next, an undercoat layer was formed to a thickness of 7 µm by applying the resulting coating solution X for the undercoat layer to the roughened surface of aluminum foil, which was the collector, at a rate of 16 m/min using the extrusion nozzle method, and drying the layer in a drying oven at 110° C. Aluminum foil having a thickness of 20 µm was used and the surface was roughened by etching.

A polarizable electrode layer was formed to a thickness of 115 µm by applying the resulting coating solution Y for the polarizable electrode layer to the surface of the undercoat layer by using the extrusion nozzle method, and drying the layer in a drying oven at 120° C.

The electrode sheet sample of working example 1 was thereby completed.

Working Example 2

The electrode sheet sample of working example 2 was manufactured in the same manner as in working example 1 except that the amount in which fluorine rubber was added to the mixture was set to 229 parts by weight, and the amount of solvent was changed so that the viscosity of the coating solution X for the undercoat layer was 0.37 Pa·s in the preparation of the coating solution X for the undercoat layer of working example 1.

Therefore, in working example 2, the weight ratio (P/B) of the electroconductive particles (P) and the binder (B) included in the coating solution X for the undercoat layer was 20/80.

Working Example 3

The electrode sheet sample of working example 3 was manufactured in the same manner as in working example 1 except that the amount in which fluorine rubber was added to the mixture was set to 64 parts by weight, and the amount of solvent was changed so that the viscosity of the coating solution X for the undercoat layer was 0.37 Pa·s in the preparation of the coating solution X for the undercoat layer of working example 1.

Therefore, in working example 3, the weight ratio (P/B) of the electroconductive particles (P) and the binder (B) included in the coating solution X for the undercoat layer was 40/60.

Working Example 4

The electrode sheet sample of working example 4 was manufactured in the same manner as in working example 1 except that the amount of solvent was changed so that the viscosity of the coating solution X for the undercoat layer was 0.15 Pa·s in the preparation of the coating solution X for the undercoat layer of working example 1.

Working Example 5

The electrode sheet sample of working example 5 was manufactured in the same manner as in working example 1 except that the amount of solvent was changed so that the viscosity of the coating solution X for the undercoat layer was 0.75 Pa·s in the preparation of the coating solution X for the undercoat layer of working example 1.

Working Example 6

The electrode sheet sample of working example 6 was manufactured in the same manner as in working example 2 except that the amount of solvent was changed so that the viscosity of the coating solution X for the undercoat layer was 0.15 Pa·s in the preparation of the coating solution X for the undercoat layer of working example 2.

Working Example 7

The electrode sheet sample of working example 7 was manufactured in the same manner as in working example 2 except that the amount of solvent was changed so that the viscosity of the coating solution X for the undercoat layer was 0.75 Pa·s in the preparation of the coating solution X for the undercoat layer of working example 2.

Working Example 8

The electrode sheet sample of working example 8 was manufactured in the same manner as in working example 3 except that the amount of solvent was changed so that the viscosity of the coating solution X for the undercoat layer was 0.15 Pa·s in the preparation of the coating solution X for the undercoat layer of working example 3.

Working Example 9

The electrode sheet sample of working example 9 was manufactured in the same manner as in working example 3 except that the amount of solvent was changed so that the viscosity of the coating solution X for the undercoat layer was 0.75 Pa·s in the preparation of the coating solution X for the undercoat layer of working example 3.

Comparative Example 1

The electrode sheet sample of comparative example 1 was manufactured in the same manner as in working example 1 except that the amount in which fluorine rubber was added to the mixture was set to 559 parts by weight, and the amount of solvent was changed so that the viscosity of the coating solution X for the undercoat layer was 0.37 Pa·s in the preparation of the coating solution X for the undercoat layer of working example 1.

Therefore, in comparative example 1, the weight ratio (P/B) of the electroconductive particles (P) and the binder (B) included in the coating solution X for the undercoat layer was 10/90.

Comparative Example 2

The electrode sheet sample of comparative example 2 was manufactured in the same manner as in working example 1 except that the amount in which fluorine rubber was added to the mixture was set to 31 parts by weight, and the amount of solvent was changed so that the viscosity of the coating solution X for the undercoat layer was 0.37 Pa·s in the preparation of the coating solution X for the undercoat layer of working example 1.

Therefore, in comparative example 2, the weight ratio (P/B) of the electroconductive particles (P) and the binder (B) included in the coating solution X for the undercoat layer was 50/50.

Comparative Example 3

The electrode sheet sample of comparative example 3 was manufactured in the same manner as in working example 1 except that the amount of solvent was changed so that the viscosity of the coating solution X for the undercoat layer was 0.10 Pa·s in the preparation of the coating solution X for the undercoat layer of working example 1.

Comparative Example 4

The electrode sheet sample of comparative example 4 was manufactured in the same manner as in working example 1 except that the amount of solvent was changed so that the viscosity of the coating solution X for the undercoat layer was 0.85 Pa·s in the preparation of the coating solution X for the undercoat layer of working example 1.

Comparative Example 5

The electrode sheet sample of comparative example 5 was manufactured in the same manner as in comparative example 1 except that the amount of solvent was changed so that the viscosity of the coating solution X for the undercoat layer was 0.10 Pa·s in the preparation of the coating solution X for the undercoat layer of comparative example 1.

Comparative Example 6

The electrode sheet sample of comparative example 6 was manufactured in the same manner as in comparative example 1 except that the amount of solvent was changed so that the viscosity of the coating solution X for the undercoat layer was 0.85 Pa·s in the preparation of the coating solution X for the undercoat layer of comparative example 1.

Comparative Example 7

The electrode sheet sample of comparative example 7 was manufactured in the same manner as in comparative example 2 except that the amount of solvent was changed so that the viscosity of the coating solution X for the undercoat layer was 0.10 Pa·s in the preparation of the coating solution X for the undercoat layer of comparative example 2.

Comparative Example 8

The electrode sheet sample of comparative example 8 was manufactured in the same manner as in comparative example 2 except that the amount of solvent was changed so that the viscosity of the coating solution X for the undercoat layer was 0.85 Pass in the preparation of the coating solution X for the undercoat layer of comparative example 2.

TABLE 1 shows the viscosity and the P/B ratio of the coating solution X for the undercoat layer used in working examples 1 to 9 and comparative examples 1 to 8.

TABLE 1

| | P/B | VISCOSITY (V10) [Pa·s] | COATING ACCURACY | THICKNESS ELEVATION DIFFERENCE [μm] | DEFECTIVE RETIO OF ADHESION | INTERNAL RESISTANCE [Ω·cm$^2$] |
|---|---|---|---|---|---|---|
| WORKING EXAMPLE 1 | 30/70 | 0.37 | GOOD | 4 | 0/10 | 1.6 |
| WORKING EXAMPLE 2 | 20/80 | 0.37 | GOOD | 4 | 0/10 | 1.8 |
| WORKING EXAMPLE 3 | 40/60 | 0.37 | GOOD | 5 | 0/10 | 1.6 |
| WORKING EXAMPLE 4 | 30/70 | 0.15 | GOOD | 5 | 0/10 | 1.7 |
| WORKING EXAMPLE 5 | 30/70 | 0.75 | GOOD | 5 | 0/10 | 1.6 |
| WORKING EXAMPLE 6 | 20/80 | 0.15 | GOOD | 5 | 0/10 | 1.9 |
| WORKING EXAMPLE 7 | 20/80 | 0.75 | GOOD | 4 | 0/10 | 1.9 |
| WORKING EXAMPLE 8 | 40/60 | 0.15 | GOOD | 6 | 0/10 | 1.8 |
| WORKING EXAMPLE 9 | 40/60 | 0.75 | GOOD | 5 | 0/10 | 1.6 |
| COMPARATIVE EXAMPLE 1 | 10/90 | 0.37 | GOOD | 4 | 0/10 | 2.6 |
| COMPARATIVE EXAMPLE 2 | 50/50 | 0.37 | GOOD | 12 | 8/10 | 15.0 |
| COMPARATIVE EXAMPLE 3 | 30/70 | 0.10 | POOR | 8 | 3/10 | 4.9 |
| COMPARATIVE EXAMPLE 4 | 30/70 | 0.85 | GOOD | 6 | 2/10 | 3.6 |
| COMPARATIVE EXAMPLE 5 | 10/90 | 0.10 | POOR | 7 | 0/10 | 2.7 |
| COMPARATIVE EXAMPLE 6 | 10/90 | 0.85 | GOOD | 6 | 0/10 | 2.6 |
| COMPARATIVE EXAMPLE 7 | 50/50 | 0.10 | POOR | 14 | 10/10 | 17.6 |
| COMPARATIVE EXAMPLE 8 | 50/50 | 0.85 | GOOD | 14 | 10/10 | 22.1 |

Evaluation of Coating Accuracy

The coating accuracy of the undercoat layer was evaluated by measuring the coating width of the undercoat layer of the electrode sheet samples of working examples 1 to 9 and the electrode sheet samples of comparative examples 1 to 8.

The evaluation was determined to be "Good" if the value obtained by subtracting the minimum value from the maximum value of the coating width of the undercoat layer was less than 1.0 mm, and was determined to be "Poor" if the value was 1.0 mm or greater. This is due to the fact that if the fluctuation of the coating width of the undercoat layer is 1.0 mm or greater, a portion (or all) of the extraction electrode of the collector is ultimately covered by the undercoat layer, or the edge of the polarizable electrode layer is liable to be directly formed on the surface of the collector. The former problem is the cause of poor connections, and the latter problem is the cause of peeling due to poor adhesion.

The evaluation results are shown in TABLE 1. In the electrode sheet samples of comparative examples 3, 5, and 7, in which the viscosity of the coating solution X for the undercoat layer was 0.10 Pa·s, the fluctuation of the coating width of the undercoat layer was 1.0 mm or greater, and the coating accuracy was poor, as shown in TABLE 1 This is thought to be because the viscosity (=0.10 Pa·s) of the coating solution X for the undercoat layer used in the comparative examples 3, 5, and 7 was too low for a coating solution applied to the roughened surface of the collector.

In contrast, the fluctuation of the coating width of the undercoat layer was less than 1.0 mm, and the coating accuracy was good for the electrode sheet samples of working examples 1 to 9.

Evaluation of Nonuniformity of Film Thickness

Thickness nonuniformity in the coated film was evaluated by measuring the total thickness of the undercoat layer and polarizable electrode layer for the electrode sheet samples of working examples 1 to 9 and the electrode sheet samples of comparative examples 1 to 8.

The measurement was carried out at 10 locations in the widthwise direction and 10 locations in the lengthwise direction for a total of 20 locations, and the difference (thickness elevation difference) between the maximum thickness and the minimum thickness was evaluated.

Here, the reason that both the thickness nonuniformity of the undercoat layer and the thickness nonuniformity of the polarizable electrode layer were evaluated instead of merely the thickness nonuniformity of the undercoat layer was that, depending on the composition of the coating solution X for the undercoat layer, the surface characteristics of the polarizable electrode layer formed on the undercoat layer degraded even if the surface characteristics of the undercoat layer were good.

The evaluation results are shown in the same TABLE 1. In the electrode sheet samples of working examples 1 to 9, the thickness elevation differences were 6 μm or less, and the thickness elevation differences in examples 1, 2, and 7 in particular were very good; that is, the thickness elevation differences were 4 µm, as shown in TABLE 1.

In contrast, the thickness elevation differences were considerable in the electrode sheet samples of comparative examples 2, 7, and 8, and the presence of large thickness nonuniformities was confirmed in the coated film. This was thought to be caused by an excessively high (=the amount of electroconductive particles with respect to the binder is excessive) P/B ratio (=50/50) of the coating solution X for the undercoat layer that was used in comparative examples 2, 7, and 8.

Manufacture of an Electric Double Layer Capacitor Electrode

The electrode sheet samples of working examples 1 to 9 and the electrode sheet samples of comparative examples 1 to 8 were calendered five times under a pressure of $9.8 \times 10^3$ N/cm using a roll press machine. The calendered electrode sheet samples were then cut into rectangles of 30 mm×56 mm and vacuum dried at 180° C. for 60 hours to remove the moisture and solvents from the undercoat layer and polarizable electrode layer. The electrode samples of working examples 1 to 9 and the electrode samples of comparative examples 1 to 8 were completed in accordance with the above process.

Manufacture of Electric

Double Layer Capacitors

Electric double layer capacitors were manufactured using two samples from each of the electrode samples of working examples 1 to 9 and the electrode samples of comparative examples 1 to 8.

First, lead wires with a width of 2 mm and a length of 10 mm were arranged at the peripheral edges of collectors on which the undercoat layer and polarizable electrode layer were not formed. Electric double layer capacitor electrodes composed of an electric double layer capacitor electrode acting as an anode, a separator, and a cathode were superimposed in a state of contact (an unconnected state) in the stated order to form a stack (device) A recycled cellulose nonwoven (product name: TF4050 manufactured by Nippon Kodoshi) with a thickness of 0.05 mm was used as the separator, and the size was set to 31 mm×57 mm.

Used as the case material of the capacitor was a flexible composite packaging film in which an inner layer composed of modified polypropylene, a metal layer composed of aluminum foil, and an outer layer composed of polyamide were sequentially laminated in the stated order.

The shape of the composite laminated film was rectangular, the inner layer composed of modified polypropylene was folded at the halfway point along the long sides so as to be on the inner side, the long-side edge portions were mutually superimposed and heat sealed, and the short sides were left open to form a bag-like body. The stack (device) described above was placed in the bag-like body so that the lead wire protruded therefrom. Electrolytic solution was injected under reduced pressure, after which the open short-side edge portions were sealed under reduced pressure to obtain an electric double layer capacitor. A 1.2 mol/L propylene carbonate solution of triethyl methylammonium fluoroborate was used as the electrolytic solution.

The above-described procedure was carried out for each of the electrode samples to manufacture the capacitor samples of working examples 1 to 9 and the capacitor samples of comparative examples 1 to 8.

Evaluation of Adhesion

Adhesion between the collector and polarizable electrode layer was evaluated for the capacitor samples of working examples 1 to 9 and the capacitor samples of comparative examples 1 to 8 by using a peeling test.

A voltage of 2.5 V was applied at a temperature of 60° C. to the capacitor samples of examples 1 to 9 and the capacitor samples of comparative examples 1 to 8 by using a charge/discharge tester (product name: HJ-101SM6 manufactured by Hokuto Denko). CC-CV charging (Constant Current—Constant Voltage charging) was carried out for 24 hours at an electric current density of 5 mA/F, after which discharging to 0V was carried out at an electric current density of 5 mA/F.

After such charging and discharged were performed, the capacitor sample was disassembled, and the occurrence of peeling in the polarizable electrode layer was checked. Such a test was carried out 10 times for each of the capacitor samples of examples 1 to 9 and each of the capacitor samples of comparative examples 1 to 8. The defective ratio (defective samples/total number of samples (=10)) was calculated, wherein a "defective sample" was determined for the case in which peeling occurred in at least the anode or the cathode, and a "good sample" was determined for the case in which peeling did not occur in both the anode and the cathode.

The evaluation results are shown in TABLE 1. The defective ratio was 0 for the capacitor samples of working examples 1 to 9, as shown in TABLE 1. In other words, no samples were present in which peeling occurred in the polarizable electrode layer. In contrast, in the capacitor samples of comparative examples 2, 3, 4, 7, and 8, peeling was confirmed in a plurality of samples and the adhesion between the collector and the polarizable electrode layer was found to be low. This was thought to be mainly due to the fact that the P/B ratio of the coating solution X for the undercoat layer used in comparative examples 2, 3, 4, 7, and 8 was excessively high, and the viscosity was excessively high or excessively low.

Evaluation of Internal Resistance

The internal resistance was evaluated by the method described below for each of the capacitor samples of working examples 1 to 9 and the capacitor samples of comparative examples 1 to 8.

A voltage of 2.5 V was applied at a temperature of 60° C. to the capacitor samples of examples 1 to 9 and the capacitor samples of comparative examples 1 to 8 by using the charge/discharge tester described above. CC-CV charging was carried out for 24 hours at an electric current density of 5 mA/F, after which discharging to 0V was carried out at an electric current density of 5 mA/F.

After such charging and discharging were performed, the resistance value at a frequency of 1 kHz was calculated as the internal resistance [$\Omega \cdot cm^2$] by using a measuring device (product name: SOLARTON manufactured by Toyo Corporation). The measurement of the internal resistance was carried out at a temperature of 25° C. and a relative humidity of 60%.

The evaluation results are shown in the same TABLE 1. The internal resistance was 1.9 $\Omega \cdot cm^2$ or less in the capacitor samples of working examples 1 to 9, and the internal resistance was particularly good at 1.6 Ω·cm² in the capacitor samples of working examples 1, 3, and 5, as shown in TABLE 1. In contrast, the internal resistance was 2.6 Ω·cm² or greater in the capacitor samples of comparative examples 1 to 8, and the internal resistance was 15.0 Ω·cm² or greater in the capacitor examples of comparative examples 2, 7, and 8 in particular, in which the P/B ratio of the coating solution X for the undercoat layer was excessively high.

Summary

It was thereby confirmed that an undercoat layer can be correctly formed on the surface of a collector whose surface has been roughened as long as the viscosity of the coating solution X for the undercoat layer is 0.15 to 0.75 Pa·s, and the weight ratio (P/B) of the electroconductive particles (P) and binder (B) is 20/80 to 40/60. On the other hand, it was confirmed that when the above conditions are not satisfied, the coating accuracy degrades, the thickness elevation difference increases, the polarizable electrode layer peels due to charging and discharging, the internal resistance increases, and other problems occur.

What is claimed is:

1. A method for producing an electrochemical capacitor electrode, comprising:
    a first step for forming an undercoat layer on a collector whose surface has been roughened; and
    a second step for forming a polarizable electrode layer on said undercoat layer,
    wherein said first step is performed by coating said collector with a coating solution for the undercoat layer that includes at least electroconductive particles, a binder, and a solvent,
    a viscosity of said coating solution for the undercoat layer is set to from 0.15 to 0.75 Pa·s and a weight ratio (P/B) of said electroconductive particles (P) and said binder (B) is set to from 20/80 to 40/60.

2. The method for producing an electrochemical capacitor electrode as claimed in claim 1, wherein said electroconductive particles includes acetylene black.

3. The method for producing an electrochemical capacitor electrode as claimed in claim 2, wherein said binder is a fluorine-based binder.

4. The method for producing an electrochemical capacitor electrode as claimed in claim 2, wherein said solvent includes a good solvent that dissolves said binder and a poor solvent that does not dissolve said binder.

5. The method for producing an electrochemical capacitor electrode as claimed in claim 1, wherein said binder is a fluorine-based binder.

6. The method for producing an electrochemical capacitor electrode as claimed in claim 5, wherein said solvent includes a good solvent that dissolves said binder and a poor solvent that does not dissolve said binder.

7. The method for producing an electrochemical capacitor electrode as claimed in claim 1, wherein said solvent includes a good solvent that dissolves said binder and a poor solvent that does not dissolve said binder.

8. The method for producing an electrochemical capacitor electrode as claimed in claim 7, wherein said solvent includes methyl isobutyl ketone.

9. The method for producing an electrochemical capacitor electrode as claimed in claim 7, wherein said second step is performed by coating said undercoat layer with a coating solution for the polarizable electrode layer that includes porous particles, a fluorine-based binder, a good solvent that dissolved said fluorine-based binder, and a poor solvent that does not dissolve said fluorine-based binder,
    a viscosity of said coating solution for the polarizable electrode layer is set to from 0.5 to 3.5 Pa·s and a weight ratio (GS/PS) of said good solvent (GS) and said poor solvent (PS) is set to from 60/40 to 80/20.

10. The method for producing an electrochemical capacitor electrode as claimed in claim 1, wherein said solvent includes methyl isobutyl ketone.

11. The method for producing an electrochemical capacitor electrode as claimed in claim 10, wherein said second step is performed by coating said undercoat layer with a coating solution for the polarizable electrode layer that includes porous particles, a fluorine-based binder, a good solvent that dissolved said fluorine-based binder, and a poor solvent that does not dissolve said fluorine-based binder,
    a viscosity of said coating solution for the polarizable electrode layer is set to from 0.5 to 3.5 Pa·s and a weight ratio (GS/PS) of said good solvent (GS) and said poor solvent (PS) is set to from 60/40 to 80/20.

12. The method for producing an electrochemical capacitor electrode as claimed in claim 1, wherein said second step is performed by coating said undercoat layer with a coating solution for the polarizable electrode layer that includes porous particles, a fluorine-based binder, a good solvent that dissolved said fluorine-based binder, and a poor solvent that does not dissolve said fluorine-based binder,
    a viscosity of said coating solution for the polarizable electrode layer is set to from 0.5 to 3.5 Pa·s and a weight ratio (GS/PS) of said good solvent (GS) and said poor solvent (PS) is set to from 60/40 to 80/20.

* * * * *